United States Patent Office 3,168,510
Patented Feb. 2, 1965

3,168,510
FATTY AMINE DERIVATIVES OF PROTEINS
John J. Krajewski, Chicago, Ill., assignor to Swift & Company, Chicago, Ill., a corporation of Illinois
No Drawing. Filed Feb. 2, 1961, Ser. No. 86,576
7 Claims. (Cl. 260—117)

This invention relates to the treatment of proteinaceous materials and more particularly to a process and the products prepared in the treatment of such proteinaceous materials with amines.

Modification of proteinaceous materials to enhance the value of these materials has in the past been suggested and these modification procedures have involved a variety of techniques, including reacting the protein with urea, isocyanic acid, etc. The present invention provides a new protein modification process which can be utilized to upgrade proteinaceous materials and provide in such materials a variety of important new properties.

It is, therefore, an object of this invention to provide an improved method for treating proteinaceous materials to enhance the value of such materials and produce valuable industrial chemical products.

Another object of the invention is to provide improved modified proteinaceous-amine compositions.

Still another object of the invention is the provision of protein amides of high viscosity and gel strength.

Additional objects, if not specifically set forth herein, will be readily apparent to those skilled in the art from the detailed description of the invention which follows.

Generally, the present invention involves the treatment of proteins and protein derivatives, as well as degradation products derived from proteins by hydrolysis, with higher aliphatic amines to improve the proteinaceous material and modify the proteinaceous materials for use as surface-active agents, thickening agents, etc. It is possible in accordance with the invention to produce valuable new products derived from proteins and protein derivatives, including protein degradation products.

More particularly, the invention involves the treatment of proteins with higher aliphatic amines to produce protein-fatty amine salts and protein-fatty amides. Such treatment provides a profound improvement in the utility of the proteinaceous compositions, rendering such materials of significant value in industrial use. While not restricted to inedible protein materials, the invention is of particular value in enhancing the value of such inedible proteins. Further, the product, even if prepared from an edible protein, will be considered inedible because of the presence of the amine. It is possible to increase the viscosity of proteins and to provide modified proteins which have an increased solubility in water and also an increased ability to reduce the surface tension characteristics of aqueous media. Protein-amine salts are prepared by combining a higher aliphatic amine with a proteinaceous material in an aqueous medium. When the salt is formed the bulk of the water is removed and the product is then subjected to drying conditions. The salt-protein derivative is characterized by a higher viscosity and reduced setting time compared to the protein before modification. Usually about 2–25% of the amine or water-soluble amine salt based on the weight of the protein is employed.

Further treatment of amine salt as described herein results in the production of protein amides. Heating of the dry protein-amine salt at the desired temperature results in amidification with loss of water to produce a product of even greater viscosity.

Production of the protein-amine salts involves the treatment of the proteinaceous product in the presence of water with a higher aliphatic amine. The product is then desirably treated to remove water and the dried salt is then ground. The protein-amine salt possesses a higher viscosity, a higher gel strength, and reduced setting time compared to the protein before treatment. These characteristics, particularly reduced setting time, are important where the protein such as gelatin is to be employed in photographic emulsions. The salts are preferably prepared from an amine-supplying component comprising a primary, secondary or tertiary amine or mixtures thereof. Also, contemplated are derivatives of the amines which dissociate when heated or dissolved to provide the free amine. This includes the water-soluble amine salts of organic and inorganic acids, such as the amine hydrochlorides, amine acetates, amine carbonates, amine phosphates, amine sulfates, etc.

Suitable amine-supplying compositions are aliphatic amines having the structure

where at least one of the R groups is selected from the group consisting of alkyl and alkenyl radicals of 6–20 carbon atoms and the remaining R groups are selected from hydrogen and alkyl and alkenyl radicals having not more than about 4 carbon atoms. While the alkyl and alkenyl chains can be substituted with noninterfering halogen or other substituents, these chains should be free of hydroxyl groups. The higher fatty monoamines, including primary, secondary, and tertiary amines, may be employed in forming the amine salt. Primary amines, as well as the water-soluble acid salts of these amines, are particularly advantageous as the source of the amine. Higher fatty primary amines having 6–20 carbon atoms in the alkyl or alkenyl chain can be employed to improve the gel strength and viscosity of the protein appreciably. Hexylamine, octylamine, decylamine, dodecylamine, hexadecylamine, and other fatty amines including octadecyl and octadecenyl amines and mixtures thereof are examples of satisfactory primary amines. A particularly desirable group of fatty amines is the mixed fatty amines derived from naturally occurring animal, vegetable, and marine glycerides. The fatty acids derived from soybean oil, cottonseed oil, tallow, perilla oil, peanut oil, lard oil, etc., form corresponding soya amine, cottonseed amine, tallow amine, etc., where the amine is a mixture of amines having chain lengths corresponding to the fatty acids from which they are derived.

Secondary amines should have one long-chain aliphatic hydrocarbon radical and one short-chain aliphatic hydrocarbon radical. A proper balance between alkyl and alkenyl radicals where one or both are involved should be maintained so that the total number of carbon atoms in the two chains attached to the amino nitrogen does not exceed about 24 carbon atoms. It appears that in order to avoid steric hinderance a secondary amine having one long fatty chain should have as the additional aliphatic radical a chain not longer than about 4 carbons. Thus, methyl, ethyl, propyl, isopropyl, butyl, and isobutyl radicals can represent the second radical in a secondary fatty amine. These secondary amines, like the primary amines, are insoluble or substantially insoluble in water at ambient temperatures although the acid salts of such amines are fairly water-soluble.

Typical tertiary amines which can be employed to prepare the protein-amine salts include those of the structure

where R is selected from alkyl and alkenyl radicals of 6–20 carbons and mixtures thereof; R' and R" may be the same or different and are selected from alkyl and alkenyl radicals of 1–3 carbons and mixtures thereof.

Since gelatin is a common protein having fairly uniform characteristics, this protein has been employed to illustrate the invention in the example which follows. It should be understood, however, that the invention is concerned with the treatment of various proteinaceous materials such as animal glue, casein, soybean protein, cottonseed protein, hoofs, horns, feathers, hide trimmings, vegetable seed meals, offal, etc. The marked viscosity increase and improvement in setting time in the modified protein compared to the unmodified protein is illustrated in Examples I–III, which follow.

EXAMPLE I 100 grams of acid-cured gelatin was placed in 400 milliliters of water and the mixture was permitted to stand at room temperature for one hour to permit the gelatin to swell. The swollen gelatin was then heated on a steam bath until it was liquefied, at which time 2 grams of coconut oil fatty acid amine was added with stirring. Stirring and heating was continued for about 15 minutes and the product was then transferred to a tray and cooled to about 15° C. in a referigerator. The gelled product was then cut into strips, air-dried on screens, and milled. The resulting product has a viscosity of 79 millipoises and a jelly strength of 337 grams. The gelatin before treatment had an initial viscosity of 51 millipoises and a jelly strength of 294 grams. The coconut oil fatty acid amine which is largely a mixture of lauryl amine and myristyl amine, as can be seen from the result obtained, is a very effective fatty amine in increasing the viscosity and jelly strength of the starting protein.

EXAMPLE II

Varying amounts of fatty amine were added to gelatin derived from the same source as that employed in Example I. The effect on viscosity and jelly strength was noted. The products were prepared in accordance with the method set forth in Example I and the jelly strength and viscosity of the products is set forth in Table I which follows:

*Table I*

| Amount of Coconut Oil Fatty Acid Amino | Final Viscosity, Millipoises | Jelly Strength, Grams |
| --- | --- | --- |
| 0% | 51 | 294 |
| 2% | 79 | 337 |
| 5% | 152 | 340 |
| 10% | 225 | 414 |
| 15% | 301 | 464 |
| 20% | 1,100 | 410 |

EXAMPLE III

Various proteins were treated with fatty amines to produce the amine salt. The procedure employed was similar to that described in Example I. The initial viscosity and jelly strength, as well as the viscosity and jelly strength of the protein-amine salt was noted. The products and the characteristics of the product are noted in Table II which follows:

*Table II*

| Protein | Protein | | Amine, Amount Employed | Protein-Amine Salt | |
| --- | --- | --- | --- | --- | --- |
| | Viscosity, mp. | Jelly Strength, g. | | Viscosity, mp. | Jelly Strength, g. |
| Casein | | | | Rubbery solid | 380 |
| Animal Glue | 135 | 379 | Coconut Oil Amine —5%. | 176 | |

The data for jelly strength and viscosity as reported herein were obtained by employing conventional procedures. Viscosity was determined in accordance with the funnel viscosity procedure wherein 7.15 grams gelatin or 14.3 grams glue in 100 ml. distilled water is allowed to flow through a glue viscosity pipet (Scientific Glass Apparatus Co., Bloomfield, N. J.) at 60° C. and the time for flow-through is recorded. Jelly strength was determined by the method outlined in Official Methods of Analysis of Association of Official Agricultural Chemists (1960), 9th edition.

Drying of the protein-amine salt may be carried out by air-drying on screens, freeze drying, spray drying, or drum drying at moderate temperatures.

In the process for preparing the salt it is only necessary that sufficient water be used with the protein to insure proper fluidity of the mixture, thus permitting good mixing between the fatty amine and the protein. Depending upon the particular protein being treated, about one or more parts of water for each part of protein will be found satisfactory. Further, the degree of heating necessary when adding the fatty amine to the water-protein mixture is only that necessary to insure that the protein is melted or is in solution.

In those cases involving proteins which are not water-soluble or easily water-dispersible, it may be necessary to use a small amount of a polar solvent, such as ethanol, to obtain good mixing of the amine and protein. In some cases it may be desirable to form a salt of the protein to solubilize the protein. This method should not be employed, however, unless a salt can be prepared which is less basic than the amine. This is to insure that exchange of the amine group for the basic ion will be realized. The amine salt, as is apparent from the foregoing description, is formed at available carboxyl groups of the protein.

The amidated protein which possesses a greatly increased viscosity over the protein-fatty amine salt is prepared by heating the salt at an elevated temperature above about 100° C. for a time sufficient to cause said salt to fuse. While primary, secondary, and tertiary amine salts can be employed in forming the protein amine salt, only those protein amine salts of primary and secondary amines can be employed in forming the protein amide. Thus, the protein-fatty amine salt from which the protein amide is prepared must possess at least one amino hydrogen and should have no more than about 5% water for best results. Production of the amide involves the removal of water from the salt and, accordingly, temperatures in excess of about 100° C., the boiling point of water, are preferred. Temperatures which are excessive and which result in degradation and hydrolysis of the protein are to be avoided. Usually, temperatures in the range of about 100–150° C. are preferred in preparing the amidated protein. The time of heating varies with the particular protein-fatty amine salt being treated and the temperature at which the heating is carried out. The use of temperatures at the low end of the range requires that heating be carried out for a longer period of time, while the salt is more rapidly converted to the amide at higher temperatures.

EXAMPLE IV

The protein-coconut oil fatty acid amine salt reported in Table I wherein 15% based on the weight of the protein of the coconut oil fatty acid amine was employed was heated at 130° C. for 2 hours. The salt which had a viscosity of 301 millipoises before heating exhibited a viscosity of 21,500 millipoises after 2 hours at the elevated temperature. While the amidification action can be carried out at atmospheric pressure, it is also possible to employ subatmospheric pressures down to about 20 millimeters of mercury. A higher vacuum than about 20 millimeters mercury results in removal of the fatty amine by distillation.

Obviously, many modifications and variations of the invention as hereinbefore set forth may be made without departing from the spirit and scope thereof, and, therefore, only those limitations should be imposed as are indicated in the appended claims.

I claim:
1. A water-soluble, high viscosity amine salt of a protein, said protein selected from the group consisting of gelatin and animal glue; and said amine having the structure

wherein R is an alkyl radical of about 6 to 20 carbon atoms, and R' and R" are selected from a group consisting of hydrogen and alkyl radicals having not more than about 4 carbon atoms.

2. The composition of claim 1 wherein the amine is a primary amine.

3. A water-soluble, high viscosity higher aliphatic monoamine salt of gelatin, said amine having the structure

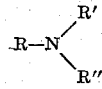

wherein R is an alkyl radical of about 6 to 20 carbon atoms, and R' and R" are selected from the group consisting of hydrogen and alkyl radicals having not more than about 4 carbon atoms.

4. The composition of claim 3 wherein the amine is a primary amine.

5. As a composition of matter, an amide of an aliphatic monoamine and a protein, said monoamine having the structure

wherein R is an alkyl radical of about 6 to 20 carbon atoms, and R' is selected from the group consisting of hydrogen and alkyl radicals having not more than about 4 carbon atoms, said protein being selected from the group consisting of gelatin and animal glue.

6. The composition of claim 5 wherein the amine is a primary amine.

7. The composition of claim 5 wherein the protein is gelatin.

References Cited in the file of this patent
UNITED STATES PATENTS

| | | |
|---|---|---|
| 2,318,046 | Bersworth | May 4, 1943 |
| 2,514,635 | Gates | July 11, 1950 |
| 2,597,228 | Cornwell | May 20, 1952 |
| 2,694,666 | Parfentjer | Nov. 16, 1954 |
| 2,925,317 | Moore | Feb. 16, 1960 |

UNITED STATES PATENT OFFICE
CERTIFICATE OF CORRECTION

Patent No. 3,168,510 February 2, 1965

John J. Krajewski

It is hereby certified that error appears in the above numbered patent requiring correction and that the said Letters Patent should read as corrected below.

Column 6, lines 6 to 9, the formula should appear as shown below instead of as in the patent:

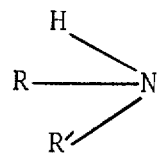

Signed and sealed this 21st day of September 1965.

(SEAL)
Attest:

ERNEST W. SWIDER
Attesting Officer

EDWARD J. BRENNER
Commissioner of Patents